(12) United States Patent
Yun et al.

(10) Patent No.: US 7,263,066 B1
(45) Date of Patent: Aug. 28, 2007

(54) SWITCH FABRIC BACKPLANE FLOW MANAGEMENT USING CREDIT-BASED FLOW CONTROL

(75) Inventors: Kenneth Yi Yun, San Diego, CA (US); Jianfeng Shi, Encinitas, CA (US); Viet Linh Do, La Jolla, CA (US); Michael John Hellmer, Carlsbad, CA (US); Kevin Warren James, San Diego, CA (US); Kirk Alvin Miller, San Diego, CA (US); Sushil Kumar Singh, San Diego, CA (US); David Thomas Dougherty, Rancho Santa Fe, CA (US); John Calvin Leung, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1003 days.

(21) Appl. No.: 10/395,369

(22) Filed: Mar. 24, 2003

Related U.S. Application Data

(63) Continuation-in-part of application No. 10/171,139, filed on Feb. 24, 2003, and a continuation-in-part of application No. 10/035,835, filed on Dec. 24, 2001, now Pat. No. 7,020,131, and a continuation-in-part of application No. 10/029,581, filed on Dec. 20, 2001, and a continuation-in-part of application No. 10/022,673, filed on Dec. 17, 2001, now Pat. No. 7,079,545, and a continuation-in-part of application No. 10/023,266, filed on Dec. 14, 2001, now abandoned.

(51) Int. Cl.
*H04L 12/26* (2006.01)

(52) U.S. Cl. ............ 370/236; 370/392; 370/412; 370/429

(58) Field of Classification Search ............ None
See application file for complete search history.

(56) References Cited

U.S. PATENT DOCUMENTS

| | | | | |
|---|---|---|---|---|
| 5,610,745 A | * | 3/1997 | Bennett | 398/52 |
| 5,852,602 A | * | 12/1998 | Sugawara | 370/235.1 |
| 6,345,040 B1 | * | 2/2002 | Stephens et al. | 370/232 |
| 6,647,019 B1 | * | 11/2003 | McKeown et al. | 370/422 |
| 7,023,857 B1 | * | 4/2006 | Chiussi et al. | 370/395.4 |

(Continued)

*Primary Examiner*—Hassan Kizou
*Assistant Examiner*—Brian Roberts
(74) *Attorney, Agent, or Firm*—Law Office of Gerald Maliszewski; Gerald Maliszewski

(57) ABSTRACT

A credit-based system and method are provided for managing backplane traffic flow in a packet communications switch fabric. The method comprises: accepting information packets including cells and cell headers with destination information; modifying the destination information in the received cell headers; routing information packets between an input port card and output port cards on backplane data links through an intervening crossbar; at the input port card, maintaining a credit counter for each output port card channel; decrementing the counter in response to transmitting cells from the input port card; generating credits in response to transmitting cells from an output port card channel; and, using modified destination information, sending the generated credits to increment the counter. In some aspects, modifying the destination information in the received packet headers includes: extracting the output port card termination from the card field; and, inserting the input port card source in the card field.

29 Claims, 9 Drawing Sheets

U.S. PATENT DOCUMENTS 7,085,846 B2 * 8/2006 Jenne et al. ................. 709/232
7,102,999 B1 * 9/2006 Sindhu et al. .............. 370/235
2003/0112757 A1 * 6/2003 Thibodeau et al. ......... 370/231
2004/0153566 A1 * 8/2004 Lalsangi et al. ............ 709/234

* cited by examiner

THIS FIGURE SHOWS THE EGRESS MS PORT CARD #3 RETURNING FLOW CONTROL CREDIT THROUGH THE BACKPLANE TO INGRESS PQS ON PORT CARDS #9 AND #24.

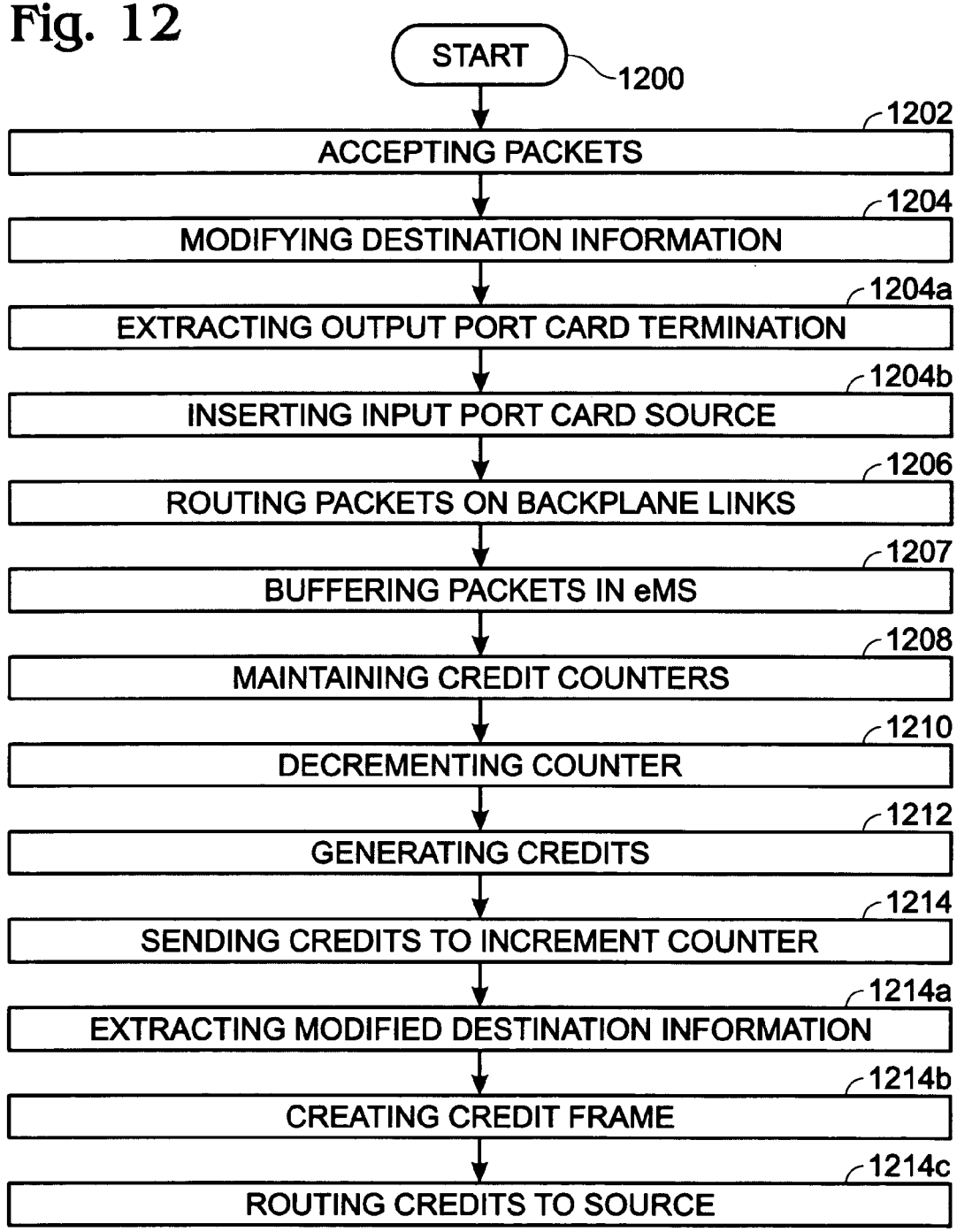

Fig. 13 *(PRIOR ART)*
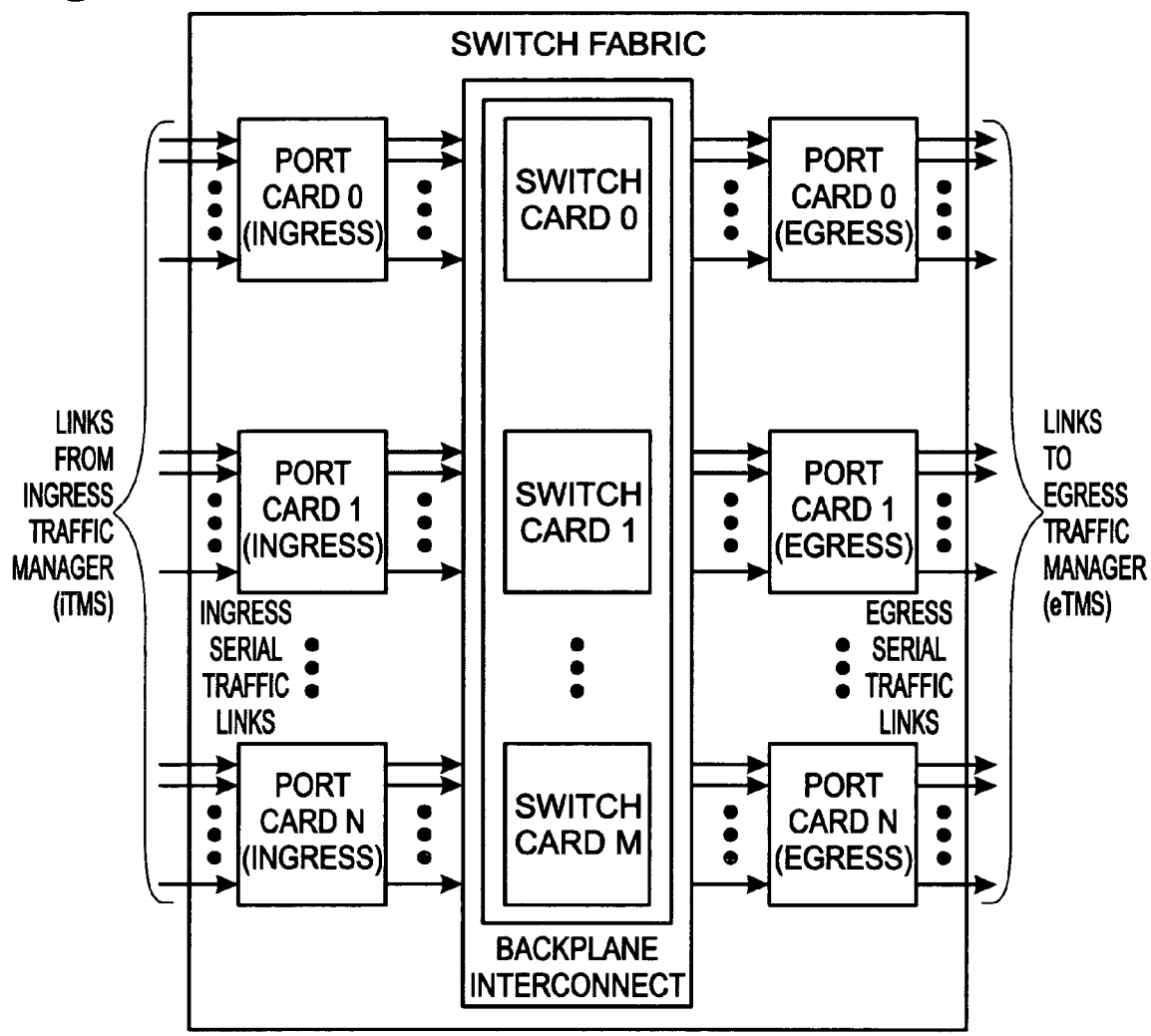

SWITCH FABRIC BACKPLANE FLOW MANAGEMENT USING CREDIT-BASED FLOW CONTROL

RELATED APPLICATIONS

This application is a continuation-in-part of an application entitled, SYSTEM AND METHOD FOR SWITCHING VARIABLY SIZED INFORMATION GROUPS, invented by Yun et al., Ser. No. 10/023,266, filed Dec. 14, 2001, now abandoned.

This application is a continuation-in-part of an application entitled, SYSTEM AND METHOD FOR SIMULTANEOUS DEFICIT ROUND ROBIN PRIORITIZATION, invented by Yun et al., Ser. No. 10/022,673, filed Dec. 17, 2001, now U.S. Pat. No. 7,079,545.

This application is a continuation-in-part of a pending application entitled, SYSTEM AND METHOD FOR GRANTING ARBITRATED BIDS IN THE SWITCHING OF INFORMATION, invented by Yun et al., Ser. No. 10/029,581, filed Dec. 20, 2001.

This application is a continuation-in-part of an application entitled, SYSTEM AND METHOD FOR HIERARCHIAL SWITCHING, invented by Yun et al., Ser. No. 10/035,835, filed Dec. 24, 2001, now U.S. Pat. No. 7,020,131.

This application is a continuation-in-part of a pending application entitled, SYSTEM AND METHOD FOR TOLERATING DATA LINK FAULTS IN A PACKET COMMUNICATIONS SWITCH FABRIC, invented by Clovis et al., Ser. No. 10/171,139, filed Feb. 24, 2003, which is incorporated herein by reference.

BACKGROUND OF THE INVENTION

1. Field of the Invention

This invention generally relates to packet communications switching and, more particularly, to a cut-through packet routing system and method that has been optimized to reduce latency through the switch fabric.

2. Description of the Related Art

There is industry demand for integrated circuits (ICs) switching systems that can be easily scaled for Network Access, the Network Edge, or a Core Switch Router, at the high end. SCSA (Signal Computing System Architecture) defines a switch fabric to be the facility for connecting any two (or more) transmitting or receiving Service Providers.

FIG. 13 is a schematic block diagram of a general switch fabric system (prior art). Traffic enters the system on the ingress side (the left side of the figure). Traffic exits the system on the egress side (the right side of the figure). The port card ingress and egress structures are sometimes subdivided into channels and subchannels. The packet headers specify a required destination port card, channel and subchannel. The system must synchronously route each ingress packet to the correct egress destination.

Packets are converted into frames by ingress traffic managers (iTMs). A frame is a logical unit of data, which is often a small piece of a much larger data set such as a file or image. The iTMs feed the ingress side of the fabric. The switch fabric might convert the frame format to a "native" format, and then on egress, convert the data back into the TM frame format before sending the data to the egress traffic managers (eTMs). If the frames are fixed size (for example: 53 bytes, 64 bytes, or 80 bytes), the frames are often called cells.

Protocol Specific Vs. Protocol Agnostic

A switch fabric can be protocol specific or protocol agnostic. An example of a protocol specific switch fabric would be a system designed and optimized specifically for asynchronous transfer mode (ATM) traffic. Another example would be a switch that handles only TCP/IP traffic. The obvious disadvantage of a switch fabric hardwired to handle a specific protocol is lack of flexibility. Service providers want to sell services to a variety of customers in various industries. Protocols vary from industry to industry.

Even within one protocol type, there can be protocol upgrades. For example, TCP/IP, the machine language of Internet routers, now runs primarily "IPv4." This protocol, successful as it has been, has a lack of available addresses, poor security features, and no "quality of service" (QoS) provisions. The next generation Internet protocol is "IPv6." It provides solutions to these limitations.

A protocol agnostic switch fabric works equally well with all protocol types, however, the traffic manager must be responsible for recognizing specific protocol types. The disadvantage of a protocol agnostic switch fabric is that it may be more complicated, and perhaps slower than a switch fabric dedicated to a particular protocol.

Packet Striping Vs. Single Link Per Packet

The simplest way for a traffic manager to transmit a packet into a switch fabric is to transmit the packet serially along one line. Striping is a way of achieving higher bandwidth by transmitting a single packet across multiple ingress/egress lines. For example, a TM can transmit a packet into a switch fabric eight times as fast if the packet is sliced into eight pieces (stripes) by the TM, and conveyed into the fabric along 8 parallel lines simultaneously. The fabric captures the packet in memory, routes it to the required egress destination, and slices the packet into 8 parallel lines before transmitting the packet to the egress TM.

The upside to packet striping is the potential for lower latency. There are several negative aspects of packet striping:

if one of the links is damaged (1 of 8 in the example above), the entire channel is out of service, degrading fault tolerance; and, the interface between the TM and switch fabric is more complicated. Circuitry must be used to slice the packet into stripes and reassemble it into packets.

Single-Cell Packet Vs. Multi-Cell Packets

Many switch fabrics now deployed and passing revenue traffic, especially in wide area networks (WANs), use asynchronous transfer mode (ATM) packets. ATM packets are single-cell packets, with a fixed cell size of 53 bytes, 48 bytes of which is the information payload. The ATM specification evolved in the 1980s and early 1990s. It was then believed that variable length (multi-cell) packets would be too difficult to implement at rates needed for wire-speed traffic. The single-cell solution was a compromise that would work for voice data, video data, multimedia data, email data, file data, etc. With a fixed frame size, switch designs are simplified and ultimately faster.

However, files are better sent in large frames. Voice switching performs better with small bursts of data, corresponding to analog-to-digital converter time slots. Large frames and concomitant switching latencies can render a switch useless for most 2-way voice applications. Voice communications require low latency (time delay). Since ATM had to work for all network data, the small payload (voice) requirements prevailed at the expense of the large frame applications.

For large frames or packets it is much more efficient to establish a path from an ingress port card to the required egress destination, and then leave this path undisturbed until the packet is completed. With single cell packets, the ingress port card must bid for, accept grants, and then schedule each cell of a multi-cell packet.

There are also Frame Relay switch fabrics. Frame Relay is a single-cell protocol, albeit with frame size ranging from 6 to 4096 bytes. Such switch fabrics have been deployed and passing revenue traffic since the early 1990s. These switch fabrics have generally not been used for voice data because of the large latency. Only highly compressed voice traffic works well over frame relay. Voice-over-frame relay was added as an afterthought by network engineers. Frame relay excels at data communications such as local area network internetworking (LAN-to-LAN). Such communications are very high speed and bursty, with non-critical latency constraints.

Cut-Through Vs. Store-and-Forward

The conventional method of switch fabric packet routing is called Store-and-Forward. In this method, the switch fabric accepts an input packet and buffers the packet on the ingress side of the fabric, making sure the packet was received intact, knowing the exact number of cells in the packet. The problem with the store-and-forward method is the added latency of buffering the packet. In Cut-through Packet Routing (CPR), a switch fabric is able to send the incoming packet cells to the correct egress port as soon as the destination address is known.

Memory-Based Vs. Arbitrated Crossbar

A switch fabric can use memory-based crossbars or arbitrated crossbars. A memory-based crossbar is sometimes called a "shared memory switch." Ingress packets flow from the port cards into a huge memory bank, which serve as the switch. From the memory bank, the destination address is determined from egress port destination information in the cell headers. The problem with these switch fabrics is that they become prohibitively expensive and large from all the required high-speed memory. Such fabrics cannot be used to reach terabit total switching speeds with technology available today.

It would be advantageous if a switch fabric backplane flow management could be conducted without interrupting the backplane traffic flow.

SUMMARY OF THE INVENTION

The present invention describes a credit-based system of managing switch fabric backplane traffic flow. The invention is able to track a packet from ingress to egress using a credit counter. The credit counter is decremented as cells are transmitted from input port cards and incremented, through control link communications, when output port cards transmit the cells.

Accordingly, a credit-based method is provided for managing backplane traffic flow in a packet communications switch fabric. The method comprises: at an input port card ingress port, accepting information packets including cells and cell headers with destination information; modifying the destination information in the received cell headers; routing information packets between the input port card and output port cards on backplane data links through an intervening crossbar; at the input port card, maintaining a credit counter for each output port card channel; decrementing the counter in response to transmitting cells from the input port card; generating credits in response to transmitting cells from an output port card channel; and, using the modified destination information, sending the generated credits to increment the counter.

In some aspects, modifying the destination information in the received packet headers includes: extracting the output port card termination from the card field; and, inserting the input port card source in the card field.

In other aspects, following the routing of information packets between port cards on backplane data links through an intervening crossbar, packets are buffered in an output port card egress memory subsystem (eMS). Then, sending the generated credits to increment the counter, using modified destination information, includes the eMS: extracting the destination information from the cell header; and, creating a credit frame from the modified destination information; and, routing credits to the source.

Additional details of the above-described method and a credit-based system managing backplane traffic flow in a packet communications switch fabric are provided below.

BRIEF DESCRIPTION OF THE DRAWINGS

FIG. 12 is a flowchart illustrating the present invention credit-based method for managing backplane traffic flow in a packet communications switch fabric.

FIG. 13 is a schematic block diagram of a general switch fabric system (prior art).

DETAILED DESCRIPTION OF THE PREFERRED EMBODIMENTS

Figure 1:
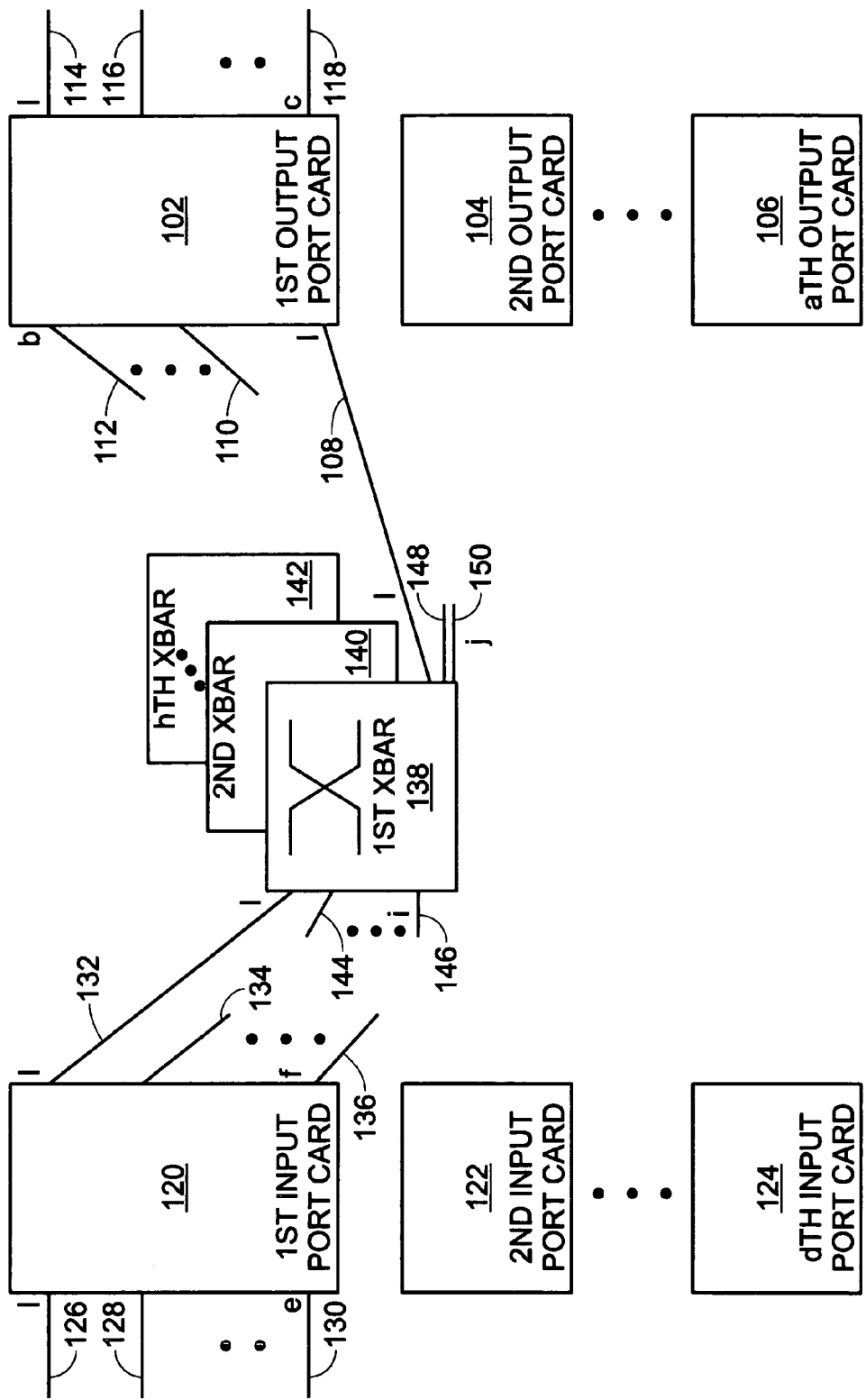
FIG. 1 is a schematic block diagram of the present invention credit-based system for managing backplane traffic flow in a packet communications switch fabric.

FIG. 1 is a schematic block diagram of the present invention credit-based system for managing backplane traffic flow in a packet communications switch fabric. The system 100 comprises an output port card including a plurality of egress channels. Shown are output port cards 1 through a (102, 104, 106, respectively), where the value of $\alpha$ is not limited to any particular value. Using the first output port card 102 as an example, a plurality of selectable backplane data links is shown. Backplane data links 1 through b are shown (108, 110, and 112, respectively), but the invention is not limited to any particular value of b.

Egress channels (ports) 1 through c are shown (114, 116, and 118, respectively). Again, c is not limited to any particular value.

The system 100 also includes an input port card. Shown are input port cards 1 through d (120, 122, and 124, respectively), where the value of d is not limited to any particular value. Using first input port cards 120 as an example, a plurality of ingress ports (channels) 1 through e (126, 128, and 130, respectively) accept information packets that including cells and cell headers with destination information. Depending upon implementation, the packets may have addressing information to select subchannels in a particular egress channel, and/or to select a class of service (COS).

The first input port card 120 includes a plurality of selectable backplane data links. Backplane data links 1 through f (132, 134, and 136, respectively) are shown. Again, the values of e and f are not limited to any particular value.

Figure 2:
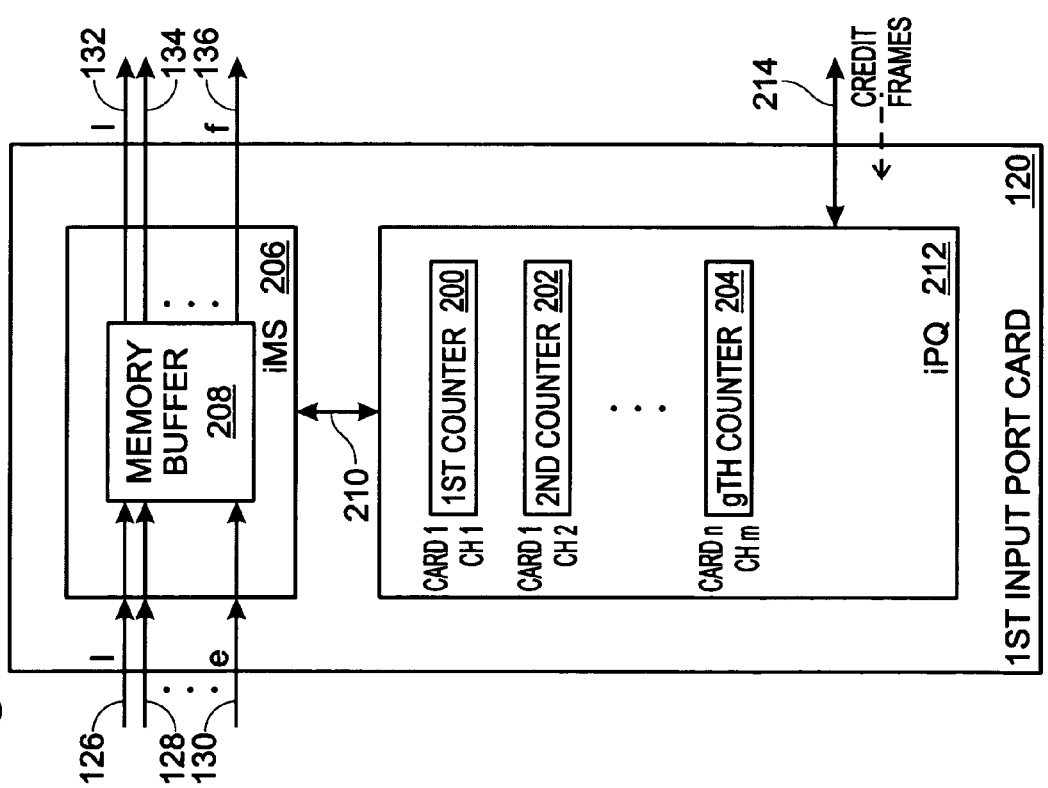
FIG. 2 is a schematic block diagram of the first input port card of FIG. 1.

FIG. 2 is a schematic block diagram of the first input port card 120 of FIG. 1. The first port card 120 includes a counter. Shown are counters 1 through g (200, 202, and 204, respectively), where g is not limited to any particular value. Using the first counter 200 as an example, the counter 200 is decremented in response to transmitting cells from a packet on the input port card backplane data links, and incremented in response to receiving credits. For example, the counter may be decremented in response to transmitting cells on backplane data link 132, and incremented in response to a cell being transmitted on the first output port card egress port on line 114 (see FIG. 1), which results in the generation of a credit that is transmitted to the counter 200.

Returning to FIG. 1, the system 100 further comprises a crossbar. Shown are crossbars 1 through h (138, 140, and 142, respectively), where the value of h is not limited to any particular value. Using the first crossbar 138 as an example, the first crossbar 138 has a plurality of inputs 1 through i (132, 144, and 146, respectively) selectively connectable to a plurality of outputs 1 through j (108, 148, and 150, respectively), where the values of i and j are not limited to any particular value. The plurality of crossbar inputs is connected to input port card backplane data links and the plurality of crossbar outputs is connected to output port card backplane data links.

Note that in some aspects of the system 100, some or all of the port cards have both ingress and egress functions. That is, a port card may be both an input port card and an output port card.

Returning to FIG. 2, the first input port card further includes an ingress memory subsystem 206 (iMS) with a memory buffer 208. The iMS 206 has inputs on lines 126 through 130 to accept packets received at the input port card ingress ports. The iMS 206 has outputs on lines 132 through 136 to supply selected packets to selected backplane data links in response to selection commands. The packets are supplied with modified destination information. The iMS 206 has a port on line 210 to receive selection commands and to supply cell transmission information that signals the transmission of buffered cells on an ingress backplane data link.

The first input port card 120 also includes an ingress priority queue (iPQ) 212 having a port on line 210 to supply selection commands to the iMS 206 and to accept cell transmission information. The counters 200 through 204 reside with the iPQ 212. The iPQ decrements a particular counter in response cell transmission information received from the iMS 206.

The iPQ 212 includes a counter for each output port card egress channel. For example, if the system includes 3 output port cards and each output port card has 3 egress channels, then 9 counters would be required. Other aspects of the system may include up to 32 output port cards, with each port card including 16 egress channels. Then, 512 (32×16) counters could be used in each input port card iPQ. Further, additional control can be added by monitoring packet transmission down to the level subchannels. If each egress channel includes 4 subchannels, then 2048 (32×16×4) counters could be used in each input port card iPQ. If the packets are tracked down to the level of COS in a subchannel, then even more counters can be used ((32×16×4×(# of COS levels)). As described below, the output port card destinations can also be cross-referenced to the input port card channels and/or subchannels on which the packets were received.

Figure 3:
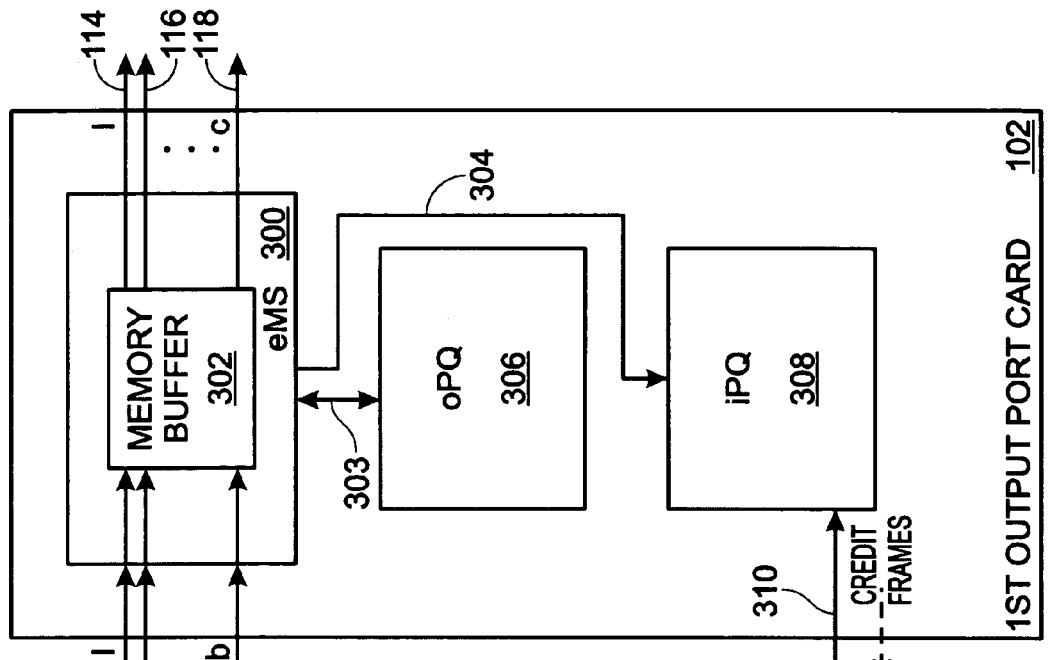
FIG. 3 is a schematic block diagram illustrating the first output port card of FIG. 1.

FIG. 3 is a schematic block diagram illustrating the first output port card 102 of FIG. 1. The first output port card 102 includes an egress memory subsystem 300 (eMS) with a memory buffer 302. The eMS 300 has inputs 108 through 112 to accept packets received at the output port card backplane data links. The eMS 300 has outputs to supply selected packets to selected output port card channels on lines 114 through 118 in response to selection commands. The eMS 300 has a port on line 303 to receive selection commands and to supply cell transmission information. The eMS 300 generates credits in response to transmitting cells and routes the credits to the iPQ counter on line 304 using the modified destination information.

The first output port card 102 includes an egress PQ 306 (oPQ) to supply the selection commands on line 303 that direct packets, received by the eMS 300, to the proper egress channel. Once received in the buffer 302, the oPQ 306 controls the linkage between the cells in the buffer 302 and the egress channels on lines 114 through 118. The iPQ 308 also has a port connected to a control link on line 310 to transmit the cell transmission information (the credits). Note the output port card 102 may also include an iMS (not shown) associated with iPQ 308 to support an ingress function.

Considering both FIG. 2 and FIG. 3, the input port card iPQ 212 has a port connected to a control link on line 214 to receive cell transmission information from the output port card iPQ 308. The input port card iPQ 212 increments a particular counter in response to the cell transmission information received from the output port card iPQ 212. For example, a first packet may be transmitted on backplane data links 132 and 108, through the first crossbar (see FIG. 1). As the information is transmitted from iMS 206, counter 200 is decremented. As the first packet is transmitted on egress channel 114, information is communicated back to the iPQ 212, and the first counter 200 is incremented.

Figure 4:
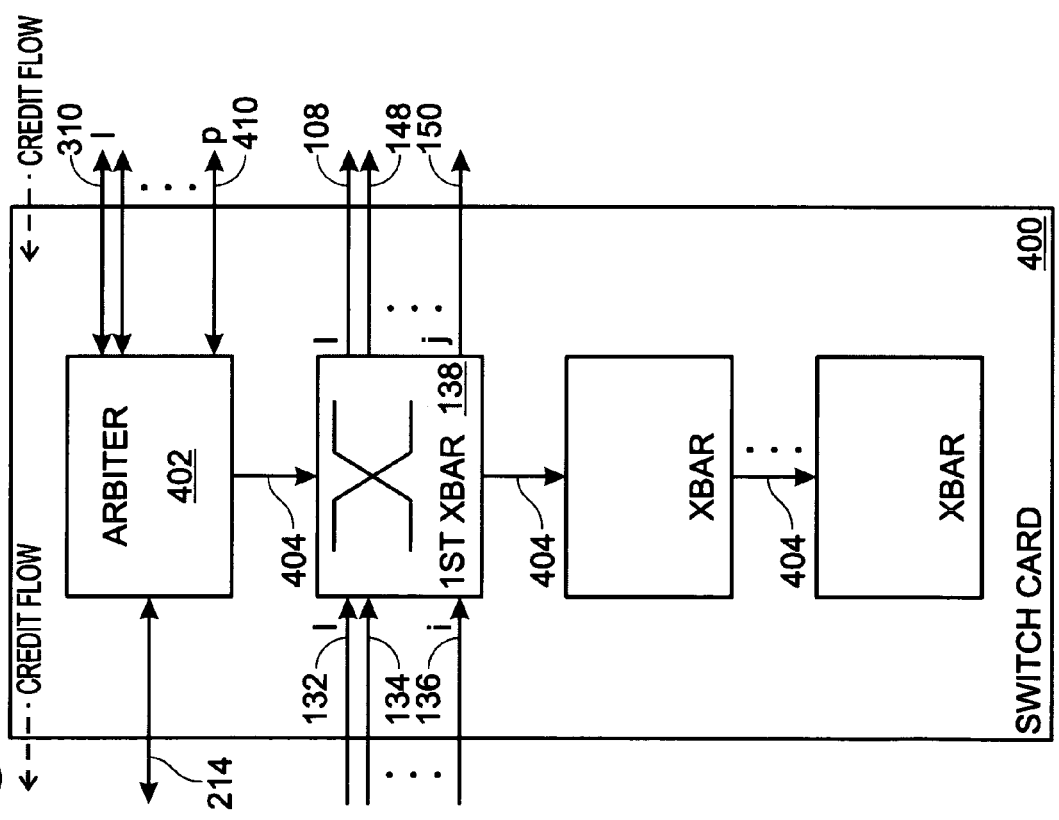
FIG. 4 is a schematic block diagram depicting the first crossbar of FIG. 1 in greater detail.

FIG. 4 is a schematic block diagram depicting the first crossbar 138 of FIG. 1 in greater detail. Shown is a switch card 400. The switch card 400 includes an arbiter 402 having a control link port connected to the input port card iPQ on line 214 and a control link port connected to the output port card iPQ on line 310. The arbiter 402 has a port on line 404 to supply crossbar selection commands. The first crossbar 138 resides with the switch card 400. The first crossbar 138 has a port on line 404 to accept selection commands from the arbiter 402.

The input port card iPQ negotiates with the arbiter 402 for backplane data link access to the crossbar 138 via the control link on line 214. The output port card iPQ communicates with the input port card iPQ via control links 310/214 through the intervening arbiter 402.

It should be understood that the system may include a plurality of switch cards, and each switch card may include a plurality of crossbars controlled by a switch card arbiter. In some aspects, each port card backplane data link is routed in parallel (parallely routed) to a plurality of switch cards. Then, each arbiter has a plurality of control links (not shown) to both input and output port cards.

Considering FIGS. 2, 3, and 4, the first input port card iMS 206 stores the head cell of a packet in the buffer 208. The head cell may include a record of the packet, such as an exact count of the number of cells in the packet, or an estimated count of cells in the packet. The iMS 206 sends a record of the packet to the input port card iPQ 212. The input port card iPQ 212 begins negotiations with the arbiter 402 for backplane data link 132 access to the crossbar 138 in response to receiving the packet record. The input port card iMS buffer 208 accepts cells in a first packet on an input port card ingress port, the port on line 126 for example, and simultaneously transmits cells from the first packet on a backplane data link, backplane data link 132 for example. Note that at least one packet cell resides in the buffer 208 during transmission through the input port card 120. In some aspects, a significant number of cells in the packet may be parallely buffered before they are transmitted on the backplane data links.

The input port card iMS 206 accepts cell headers with destination information credit frames with a card field including the output port card termination, and a port field including the output port card channel. The information that is included in the cell header destination information fields is programmable. The iMS 206 modifies the destination information in the received packet headers by extracting the output port card termination from the card field and inserting the input port card source.

The output port card eMS buffer 302 accepts cells from the first packet on a backplane data link, backplane data link 108 for example, and simultaneously transmits cells from the first packet on an output port card egress channel, the channel on line 114 for example. Note that at least one packet cell resides in the buffer 302 during transmission through the output port card 102. In some aspects, a significant number of cells in the packet may be parallely buffered before they are transmitted on the egress ports. In other aspects, cells from the first packet may be simultaneously accepted at an input port card ingress port, on line 126 for example, and transmitted on an output port card egress channel, on line 114 for example.

The eMS 300 extracts the destination information from the cell header of buffered packets and creates a credit frame from the modified destination information. The eMS 300 has an output on line 304 connected to a credit bus for routing credits to the input port card source.

Figure 5:
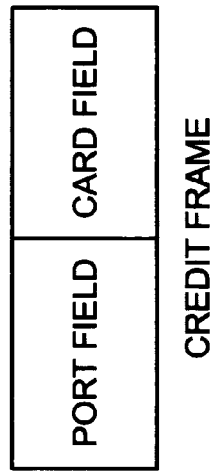
FIG. 5 is a drawing illustrating an exemplary credit frame.

FIG. 5 is a drawing illustrating an exemplary credit frame. Note that the invention is not limited to any particular frame structure or field order.

Considering FIGS. 2, 3, and 4, the eMS 300 sends the credit frame to the output port card iPQ 308 on the credit bus 304. The output card iPQ 308 sends the credit frame, via the control link on line 310, to the input port card source identified in the card field. The input port card source iPQ 212 has a port connected to a control link on line 214. The iPQ 212 increments a counter in response to receiving the credit frame via the control link 214.

More specifically, the output card iPQ 308 sends the credit frame in a bid control link communication to an arbiter, such as arbiter 402. The arbiter 402 extracts the input port card source from the card field, inserts the output port card termination, and forwards the credit frame in grant control link communications to the input port card source iPQ on line 214.

The input port card source iPQ 212 extracts the output port card termination and output port card channel from the credit frame, cross-references a counter to the specified output port card and output port card channel, and increments the cross-referenced counter. For example, if counter 200 is referenced to output port card 1, channel 1 (card 1; ch1), and a credit frame results from a cell transmission on that link, then counter 200 is incremented.

In some aspects of the system, a plurality of output port card iPQs may send a credit frame in corresponding plurality of bid control link communications to the input port card iPQ 212 through control links communications with the arbiter 402. These control links are represented as control links 1 (310) through p (410) in FIG. 4. The arbiter 401 aggregates the accepted credit frames, selects aggregated credit frames, and forwards the selected credit frames to the first input port card iPQ 212. In some aspects of the system, a single grant link communication from the arbiter 402 to the iPQ 212 may include a plurality of credit frames. The arbiter 402 may choose to send multiple credits frames from a single output port card, evenly distribute the credit frames among output port cards, or use other distribution algorithms.

In other aspects of the system, the input port card source iPQ 212 may increments a counter with a plurality of credits in response to receiving a single credit frame. Typically, the input port card iPQ 212 selects the number of credits to be incremented in response to the output port card termination and output port card channel specified in the received credit frame. For example, the iPQ 212 may be directed to increment a counter twice, for every credit frame received from output port card 1. This scenario may occur if the system discovers faulty control links or switch cards. To continue the example, the system may direct output port card iPQ 308 to send a single credit frame for every two credits, to reduce control link congestion. To compensate, the input port card iPQ 212 doubles the "value" of every credit frame received from iPQ 308.

That is, the output port card iPQ 308 divides the number of credit frames transmitted to the input port card source from the eMS 300 by n. The input pot card source iPQ 212 multiplies the number of credit frames received from the output port card by it and increments the cross-referenced counter by the product.

In other aspects of the system, the input port card iMS 206 accepts cell headers with destination information with a finer granularity than just channel information, such as the subchannel and/or the class of service (COS) associated with a specified output port card channel. Then, the input port card iPQ 212 may choose to maintain counters for destinations that include the subchannel and COS of the channel specified in the cell header destination information.

In other aspects, the input port card iMS 206 accepts cell header destination information such as the input port card channel and/or input port card subchannel. This is a typical situation, as the input port card 120 was a destination, when considered from the perspective on the ingress traffic manager (iTM) (not shown) supplying the packets. In this aspect of the invention, the input port card channel/subchannel information remains with the modified destination information that is sent to the eMS, and returned with the credit frame. The iPQ 212 may maintain counters for destinations cross-referenced to categories such as the input port card channel and/or the input port card subchannel. That is, the added input port card channel/subchannel information provides an added level(s) of granularity to counters. For example, a destination counter may be established for every input port card channel.

In some aspects of the system, the input port card iMS 206 may receive a packet with a head cell that includes a count of the estimated number of cells in the packet. The iMS 206 transmits the estimate to the input port card iPQ 212. The input port card iPQ 212 decrements a counter associated with the selected packet by the estimate, the first counter 200 for example, and counts the number of cells actually transmitted by the input port card iMS 206. Typically, the iMS sends a signal to the iPQ after the transmission of each cell from the first packet. This signal also includes information that permits the iPQ to determine when the last cell from the first packet has been transmitted by the iMS 206. The iPQ 212 calculates the difference between the estimate and actual count, and offsets the counter 200 with the calculated difference.

Offsetting permits the counter to be "zeroed" back to its initial value. Using counters, the system is able to track the status of packets through the switch fabric. More specifically, the counters enable the cut-through function across the switch fabric. The backplane data links are locked until the packet has been transferred across the fabric. That is, the links are locked until the counters are credited back to their initial state.

A watchdog timer is used to detect credit counters that have not received credits for a (programmable) period of time. Any credit counters detected as such might need credit resync sooner than normally scheduled. The watchdog timer generates a periodic pulse which has a period defined by the (programmable) credit_timer register. During each pulse a flag is set for each counter which has 0 or less credits. Simultaneously, if any flags are still set from the previous pulse, the Credit_Timeout flag is asserted in the high priority message register, and any such flags will set their corresponding bits in the 512-bit credit_timeout register. Between pulses when a credit is received, the flag for its credit flow will be cleared.

One possible cause of a "stalled" credit counter to be flagged by the watchdog timer would be a credit counter waiting for credits from a large packet discarded by the eMS due to an 8B/10B error in a cell header. The credits from the discarded packet would never arrive.

Functional Description

The present invention credit-based flow control overcomes the inherent limitations of conventional switch fabric backplane flow control mechanisms. The purpose of flow control is to coordinate the use of switch resources, to move packets and cells through the fabric without loss and without overloading switch resources. By utilizing credit-based flow control across the backplane of a switch fabric, one can individually control the amount of bandwidth and storage space that is occupied by all input-output traffic flows and thus assure Quality of Service (QoS) through the switch fabric to all the possible destinations. This provides mechanisms to enforce Service Level Agreements (SLAs) between customers and their service provider.

This prevent invention system can implemented within a variety of data processing devices such as Application Specific Standard Products (ASSPs). The AMCC Cyclone Switch Fabric chipset consists of four ASSPs: the S8505 Priority Queue (PQ), S8605 Arbiter/Crossbar, S8805 Earliest Deadline First Queue (EDFQ), and S8905 Memory Subsystem (MS). These devices are an exemplary embodiment of the above-described system.

The S8005 Cyclone series is a highly integrated, low power, area efficient chip set that meets the above-stated needs. The Cyclone switch fabric is based on a set of four highly integrated ICs which contain SERDES and memory in order to reduce the overall system power, routing complexity, and required board area. The chipset consists of the following chips:

S8505 Priority Queue (PQ)
S8605 Arbiter/Crossbar
S8805 Earliest Deadline First Queue (EDFQ)
S8905 Memory Subsystem (MS)

Figure 6:
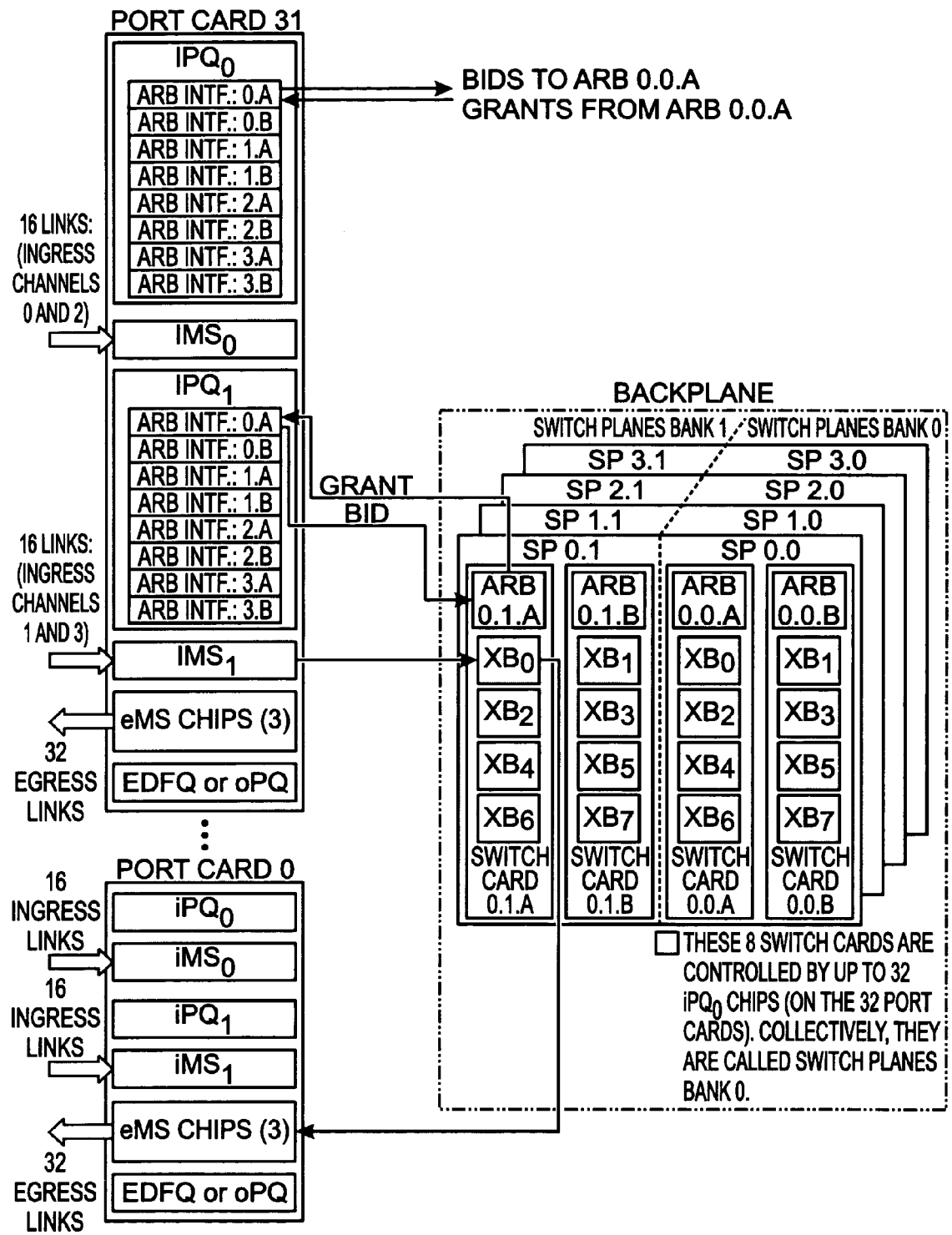
FIG. 6 provides an example switch fabric component arrangement.

FIG. 6 provides an example switch fabric component arrangement. Traffic management features are integrated into the switch fabric and occur at the ingress, switching, and egress in order to guarantee Quality of Service (QoS). The switch fabric is scalable and can terminate up to 128 OC-192's (1.28 Tbps). It can be organized as a 32×32 port switch where each port consists of four OC-192 channels, in effect implementing a 128×128 switch. The OC-192's can be either channelized or concatenated. The fabric can also be thought of as a 512×512 switch since each channel can be treated as four OC-48 subchannels.

In addition to the port cards, there are up to 16 switching cards (depending on the chosen architecture), which consist of Arbiters and Crossbars. Each switch card has connections to all the port cards. All connections (for data and for control) are serial backplane links.

One S8605 Arbiter is located on each switch card. The Arbiter is responsible for provisioning the connections between the ingress side of the fabric and the egress side and making an efficient as possible usage of the backplane resources. The Arbiter controls and configures up to five Crossbars. The Crossbar is responsible for connecting the ingress side of the fabric with the egress side, providing data skew compensation between ports, and generating idle cells for those outputs that do not have a matching input.

The Arbiter takes output-port bids from the S8505 ingress PQs (iPQs) on each of the input ports and does maximal matching with the available resources using a round robin, maximal matching, scheduling algorithm. The Arbiter is also responsible for providing a path for microprocessor communication to Cyclone chips located on the port cards.

Figure 7:
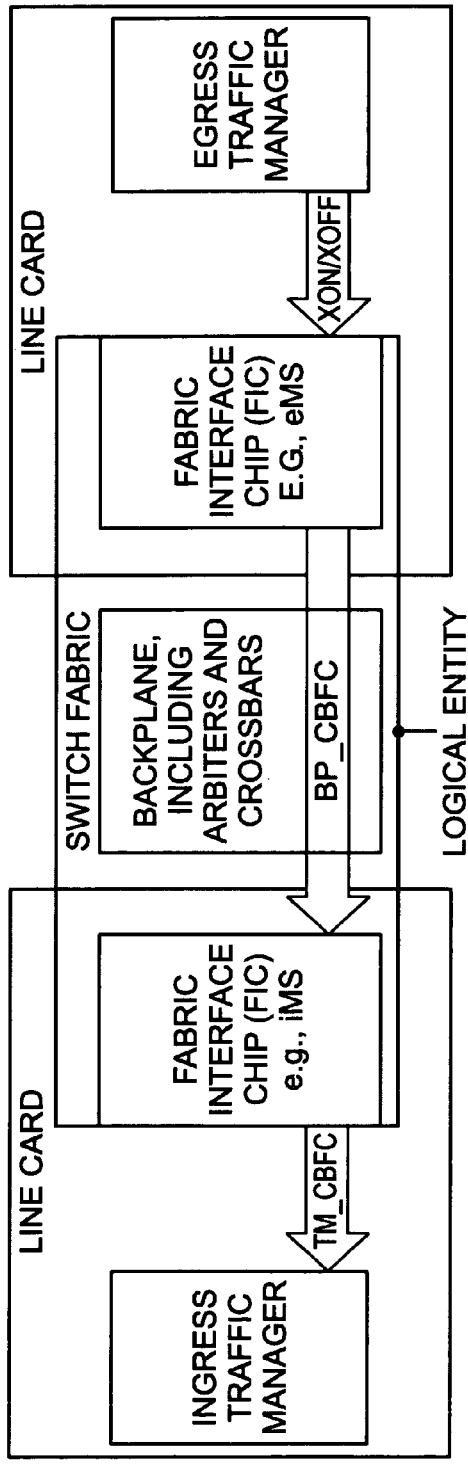
FIG. 7 is a diagram introducing the concept of flow control.

FIG. 7 is a diagram introducing the concept of flow control. The Cyclone switch fabric presents several levels of flow control to control the flow of traffic through the fabric. The present invention is specifically concerned with backplane flow control, which is responsible for controlling traffic from the input side of a line card to the output side of a line card.

The Cyclone switch fabric uses a multi-layered approach to flow control between port cards. These include:
First level: Backplane CBFC
Second level: COS level XOFF
Third level: Emergency XOFF.

The primary flow control method is BP_CBFC. The other methods are used as progressive backups that will engage infrequently.

Backplane Flow Control

Various types of flow control are supported within the Cyclone switch fabric that vary with respect to how traffic passes through the backplane. This section describes in detail how these flow control functions operate starting with credit-based.

Backplane CBFC (BP_CBFC)

Figure 8:
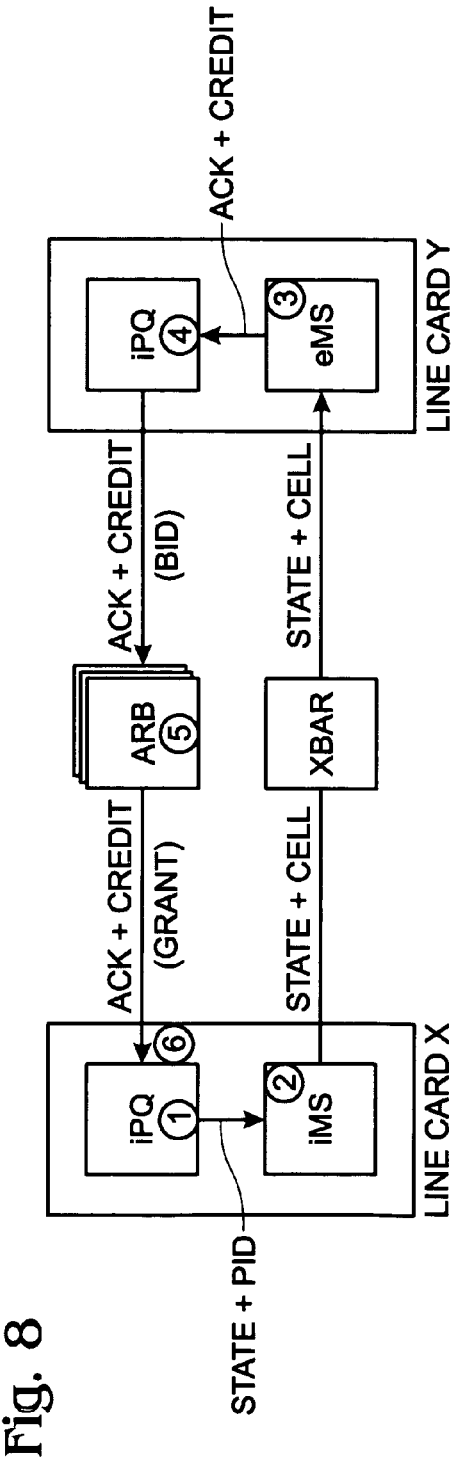
FIG. 8 is a drawing illustrating the credit path.

FIG. 8 is a drawing illustrating the credit path. Backplane credit counters reside in the iPQ (depicted on 'Line card x' in FIG. 8). There are 512 credit counters available for backplane credit flow. Partitioning of the credit counters is programmable but typically aligned with the iPQ VOQs so long as the addressing is within 9 bits. Thus in the case of 1024 queues, where there are 32 ports with 4 channels and 8 COSs, each credit counter will account for a minimum of two COSs. Whenever the iPQ sends a packet across the backplane, the corresponding credit counter is decremented by the number of cells in that packet. Credits that get sent back via the Arbiter on grant links increment the appropriate credit counters. The role of the eMS is to extract the source information from the cells it receives so as to return the credit back to its rightful owner. The eMS does this by sending the credit information to the iPQ on its port card, which then reformats and passes the credit to the Arbiter in the bid frames.

1 iPQ dequeues PID+STATE bit to the iMS to send the cell over the backplane 2 iMS sends a cell+STATE bit over the backplane 3 eMS dequeues cell to e™ and sends a CREDIT+ACK to the iPQ 4 iPQ sends ACK+CREDIT in BID frame to an Arbiter 5 Arbiter maps to appropriate iPQ and sends ACK+CREDIT in ACCEPT frame to iPQ 6 iPQ updates appropriate credit counter.

Note that the ACK and state are part of the credit resynchronization process as opposed to the BP_CBFC main process.

Sending Backplane Credits from Egress to Ingress

Figure 9:
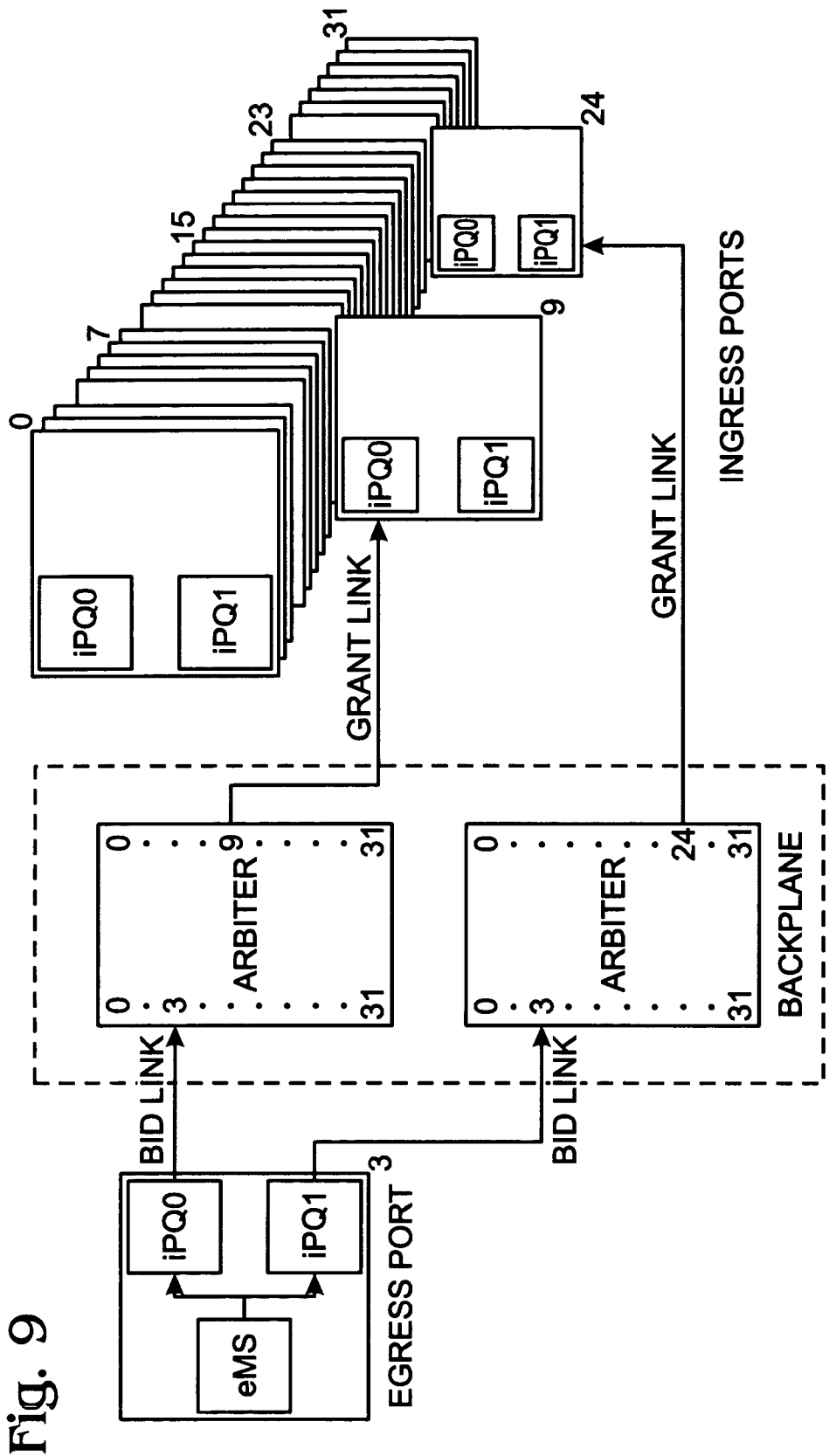
FIG. 9 shows an example of how the credit return path works in a system.

FIG. 9 shows an example of how the credit return path works in a system. The eMS on the egress port card issues credits after data traffic cells exit its buffer memory. The eMS knows which iPQ to return credit to because the sourcing port and channel (and subchannel) are part of the backplane cell format. Both iPQs (in a 4-channel port) receive the return credit information and sort out the credits it needs (by channel partition) to send to the Arbiter during bid cycles. Each Arbiter must decipher and pass the credit information to the appropriate iPQ during grant cycles. Note that egress side iPQ0 credits end up at ingress iPQ0, and egress side iPQ1 credits end up at ingress iPQ1.

Channel multicast is done in the eMS, but for flow control purposes the eMS will treat it as a unicast cell. In channel multicast, the eMS receives only one cell but replicates it to multiple destinations. However, the eMS generates only one credit+ACK, based on the lowest referenced destination of the multicast field.

Backplane Credit Resynchronization

Periodic synchronization of the backplane credit counters may be necessary to repair soft-error induced corruption of credits being transmitted, and account for lost or misdirected credit updates. Resynchronization occurs when a credit counter in the iPQ is written. The iPQ will resynchronize if the microprocessor commands a resync for a particular credit counter and when there is traffic in the flow. The iPQ will acknowledge the resync by setting Credit_Sync_Ack (bit 6 in the High Priority Message register, address 0xFE).

This generates a change in the STATE bit which is passed along with the next PID from the queue having its counter being resynchronized. Each credit counter has its own STATE bit, which is passed to the eMS across the backplane as part of the backplane packet. As soon as the eMS detects a state change in the STATE bit, it immediately returns an ACK back to the originating iPQ to minimize resynchronization latency. This response differs from the normal process of returning credits to the iPQ, which occurs only after the packet egresses the eMS. The eMS sends just one ACK to the iPQ on the egress port. The egress iPQ, in turn, sends a coded 5-bit port ID to an Arbiter indicating which source port to return the ACK to. The Arbiter then sends a one-bit ACK to that ingress port in the next Grant frame to that iPQ. Backplane credit resynchronization is restricted to one queue at a time per iPQ per port card, since ACKs are granular only to the iPQ level. The STATE and ACK signals are shown in FIG. 8.

Figure 10:
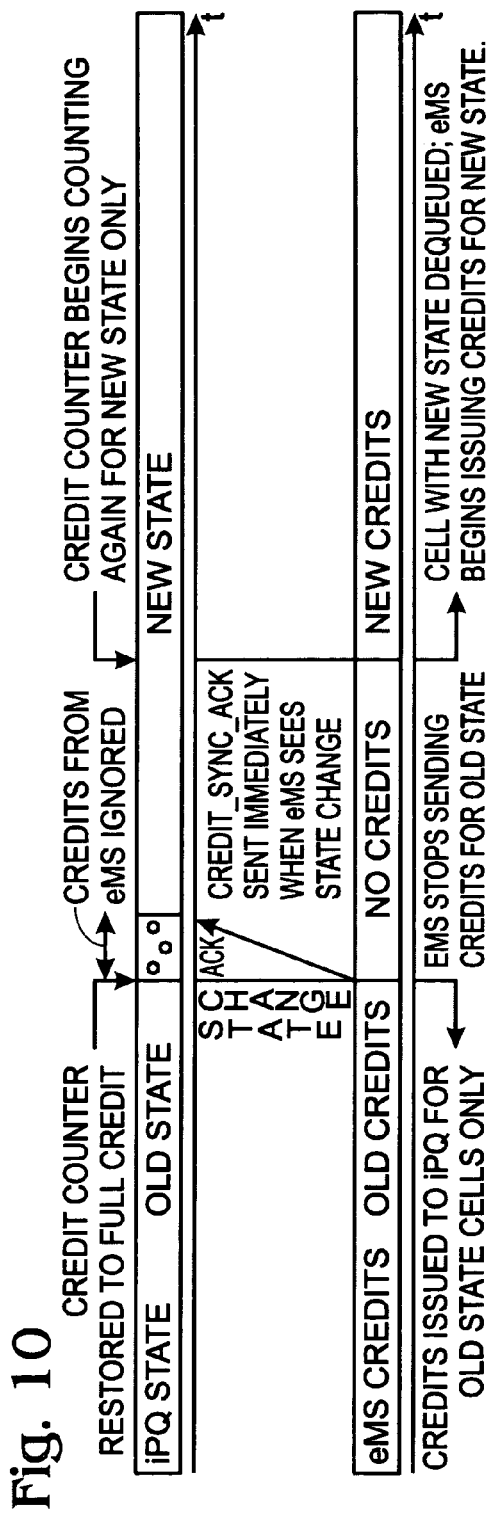
FIG. 10 displays the backplane resynchronization time line.

FIG. 10 displays the backplane resynchronization time line.

Figure 11:
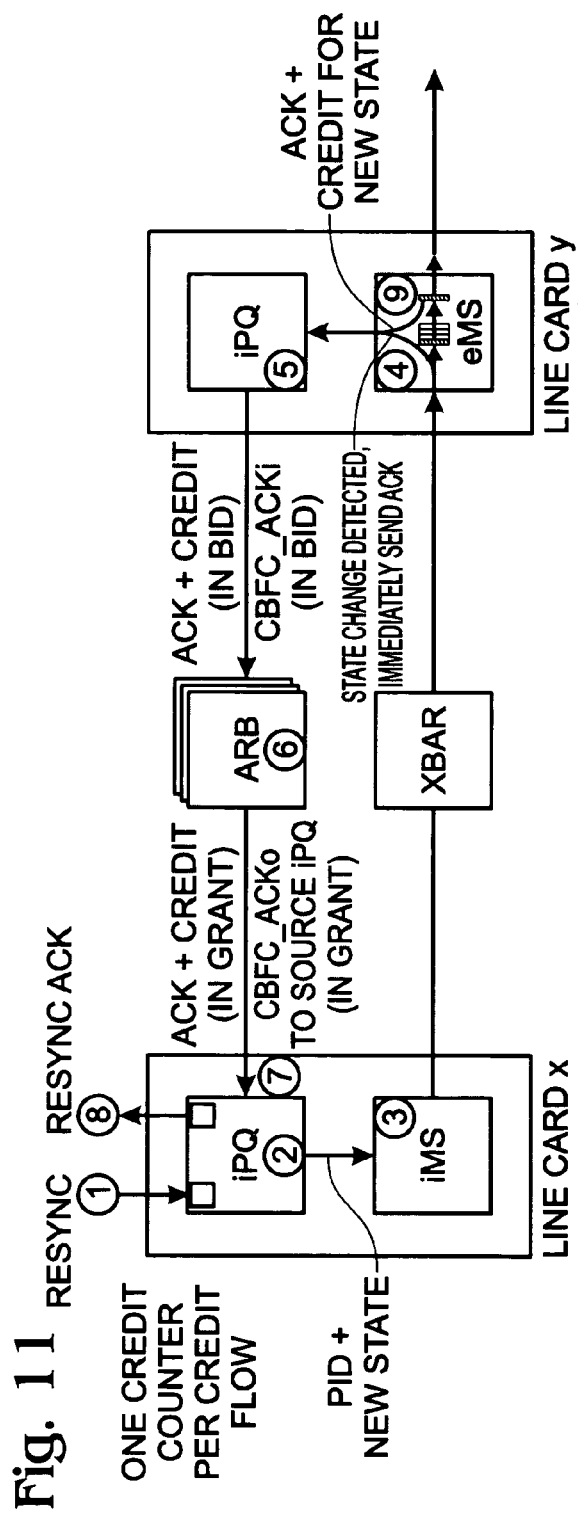
FIG. 11 illustrates the Sequence for BP_CBFC Resync.

FIG. 11 illustrates the Sequence for BP_CBFC Resync. The following is a sequence of events for a BP_CBFC resync. The resync begins when writing to the resync counter for a destination.

1 BP_CBFC resync begins when a backplane resync credit counter for an output queue is written to.

2 iPQ toggles STATE bit and dequeues PID+NEW STATE bit to the iMS to send over the backplane.

3 iMS sends cell+new STATE bit over the backplane.

4 eMS detects STATE bit changed and immediately sends ACK to iPQ on same card, and stops returning credits for old state.

5 iPQ sets CBFC_ACKi Port ID and enable fields in next Bid frame to Arbiter.

6 Arbiter maps to appropriate iPQ and sets CBFC_ACKo bit to ACK the resync.

7 iPQ gets CBFC_ACKo.

8 iPQ sets credit resync acknowledge bit in High Priority Message Register.

9 When eMS dequeues cell with the new STATE bit, it begins returning credit+ack to the source counter.

The resync is acknowledged by the iPQ setting a bit in the High Priority Message Register. This indicates to the firmware that a commanded resync actually occurred.

With respect to conventional switch fabrics, the present invention system provides fair and specified access to bandwidth, storage space, queue space, as follows:

Giving preference to higher priority traffic flows from certain ingress port cards over those of other port cards, where preference refers to access to switching bandwidth as well as to memory buffer and queue space.

Preventing port cards from dominating egress resources

Prevent a specific flow on a specific port card from dominating egress resources without blocking the other flows on the source port card.

Providing a method to maintain credit synchronization to compensate for transmit or receive errors.

FIG. 12 is a flowchart illustrating the present invention credit-based method for managing backplane traffic flow in a packet communications switch fabric. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 1200.

Step 1202, at an input port card ingress port, accepts information packets including cells and cell headers with destination information. Step 1204 modifies the destination information in the received cell headers. Step 1206 routes information packets between the input port card and output port cards on backplane data links through an intervening crossbar. Step 1208, at the input port card, maintains a credit counter for each output port card channel. Step 1210 decrements the counter in response to transmitting cells from the input port card. Step 1212 generates credits in response to transmitting cells from an output port card channel. Step 1214, using the modified destination information, sends the generated credits to increment the counter.

In some aspects of the method, accepting information at an input port card ingress port in Step 1202 includes buffering the packets in an ingress memory subsystem (iMS). Routing information packets between the input port card on backplane data links through an intervening crossbar in Step 1206 includes the iMS transmitting buffered packets on a selected backplane data link. Maintaining a counter for each output port card channel at the input port card in Step 1208 includes maintaining the counters in an ingress priority queue (iPQ). Then, decrementing the counter in response to transmitting cells in a packet from the input port card in Step 1210 includes the iMS communicating with the iPQ in response to transmitting a cell.

In some aspects a further step, Step 1207, following the routing of information packets between port cards on backplane data links through an intervening crossbar, buffers the packets in an output port card egress memory subsystem (eMS). Sending the generated credits to increment the counter, using modified destination information, in Step 1214 includes the eMS performing substeps. Step 1214*a* extracts the modified destination information from the cell header. Step 1214*b* creates a credit frame from the modified destination information. Step 1214*c* routes credits to the source.

In other aspects, accepting information packets including cell headers with destination information in Step 1202 includes accepting a credit frame with a card field including the output port card termination, and a port field including the output port card channel. Then, modifying the destination information in the received packet headers in Step 1204 includes substeps. Step 1204*a* extracts the output port card termination from the card field. Step 1204*h* inserts the input port card source in the card field.

In some aspects, routing credits to the source in Step 1214*c* includes additional substeps (not shown). In Step 1214*c*1 the eMS sends the credit frame to the output port card iPQ. In Step 1214*c*2 the output card iPQ sends the credit frame, via a control link, to the input port card source identified in the card field. In Step 1214*c*3 the input port card source iPQ increments the counter in response to receiving the credit frame via the control link.

In other aspects, routing information packets between port cards on backplane data links through an intervening crossbar in Step 1206 includes substeps (not shown). In Step 1206*a* each input port card iPQ negotiates with an arbiter via bid and grant control links for backplane data link access to a crossbar. In Step 1206*b* the arbiter enables backplane data link connections between the crossbar and the port cards in response to the negotiation.

In some aspects, the output card iPQ sending the credit frame, via a control link, to the input port card source identified in the card field in Step 1214*c*2 includes substeps (not shown). In Step 1214*c*2*a* the output port card iPQ sends the credit frame in a bid control link communication to an intervening arbiter. In Step 1214*c*2*b* the arbiter extracts the input port card source from the card field. In Step 1214*c*2*c* the arbiter inserts the output port card termination in the card field. In Step 1214*c*2*d* the arbiter forwards the credit frame in grant control link communications to the input port card source iPQ.

In some aspects, maintaining a counter for each output port card channel at the input port card iPQ in Step 1208 includes maintaining a plurality of counters cross-referenced to output port card terminations and output port card channels. Then, the input port card source iPQ incrementing the counter in response to receiving the credit frame via the control link in Step 1214*c*3 includes substeps (not shown). In Step 1214*c*3*a* the input port card source iPQ extracts the output port card termination and output port card channel from the credit frame. In Step 1214*c*3*b* the iPQ cross-references a counter to the specified output port card and output port card channel. In Step 1214*c*3*c* the iPQ increments the cross-referenced counter.

In other aspects, the output card iPQ sending the credit frame, via a control link, to the input port card source identified in the card field in Step 1214*c*2 other substeps (not shown). In Step 1214*c*2*e* a plurality of output port card iPQs send a credit frame in corresponding plurality of bid control link communications to a first input port card iPQ through a first intervening arbiter. In Step 1214*c*2*f* the first arbiter aggregates the accepted credit frames. In Step 1214*c*2*g* the first arbiter selects aggregated credit frames. In Step 1214*c*2*h* the arbiter forwards the selected credit frames to the first input port card iPQ.

In some aspects, the input port card source iPQ incrementing the counter in response to receiving the credit frame via the control link in Step 1214*c*3 includes incrementing the counter with a plurality of credits in response to receiving a single credit frame. For example, incrementing the counter with a plurality of credits in response to receiving a single credit frame includes selecting the plurality of credits to be incremented. In other aspects, selecting the plurality of credits to be incremented includes selecting the number of credits in response to the output port card termination and output port card channel specified in the received credit frame.

In some aspects, selecting the number of credits in response to the output port card termination and output port card channel specified in the received credit frame in Step 1214*c*3 includes substeps (not shown). Step 1214*c*3*d* selects n as the number of credits to be associated with an output port card and output port card channel. In Step 1214*c*3*e* the input pot card source iPQ multiplies the number of credit frames received from the output port card by n and incrementing the cross-referenced counter by the product. Then, the output card iPQ sending the credit frame, via a control link, to the input port card source identified in the card field in Step 1214*c*2 includes the output port card iPQ dividing the number of credit frames transmitted to the input port card source from the eMS by n.

In some aspects, accepting information packets including cell headers with output port card channel destination information in Step 1202 includes accepting information selected from the group including the subchannel and the class of service (COS) associated with the channel specified in the cell header destination information. Then, maintaining a plurality of counters cross-referenced to output port card terminations and output port card channels in Step 1208 includes maintaining counters for destinations selected from the group including the subchannel and COS of the channel specified in the cell header destination information.

In other aspects, accepting information packets including cell headers with output port card channel destination information in Step 1202 includes accepting information selected from the group including the input port card channel and input port card subchannel. This is typical, as the input port card was a destination, when considered from the perspective on the ingress traffic manager (i™) supplying the packets. In this aspect of the invention, the input port card channel/subchannel information remains with the modified destination information that is sent to the eMS and returned in a credit frame. Maintaining a plurality of counters cross-referenced to output port card terminations and output port card channels in Step 1208 includes maintaining counters for destinations cross-referenced to categories selected from the group including the input port card channel and input port card subchannel. That is, the added input port card channel/subchannel information provides an added level(s) of granularity to counters. For example, a destination counter may be established for every input port card channel.

A system and method have been provided for credit-based backplane traffic flow management in a switch fabric. Some examples have been given using credit and a counter to illustrate the invention. However, the invention is not limited to merely these examples. Other variations and embodiments of the invention will occur to those skilled in the art.

We claim:

1. In a packet communications switch fabric, a credit-based method for managing backplane traffic flow, the method comprising:

at an input port card ingress port, accepting information packets including cells and cell headers with destination information;

modifying the destination information in the received cell headers;

routing information packets between the input port card and output port cards on backplane data links through an intervening crossbar;

at the input port card, maintaining a credit counter for each output port card channel;

decrementing the counter in response to transmitting cells from the input port card;

generating credits in response to transmitting cells from an output port card channel; and, using the modified destination information, sending the generated credits to increment the counter.

2. The method of claim 1 wherein accepting information at an input port card ingress port includes buffering the packets in an ingress memory subsystem (iMS);

wherein routing information packets between the input port card on backplane data links through an intervening crossbar includes the iMS transmitting buffered packets on a selected backplane data link;

wherein maintaining a counter for each output port card channel at the input port card includes maintaining the counters in an ingress priority queue (iPQ); and, wherein decrementing the counter in response to transmitting cells in a packet from the input port card includes the iMS communicating with the iPQ in response to transmitting a cell.

3. The method of claim 2 further comprising:

following the routing of information packets between port cards on backplane data links through an intervening crossbar, buffering the packets in an output port card egress memory subsystem (eMS);

wherein sending the generated credits to increment the counter, using modified destination information, includes the eMS:

extracting the modified destination information from the cell header; and, creating a credit frame from the modified destination information; and, routing credits to the source.

4. The method of claim 3 wherein accepting information packets including cell headers with destination information includes accepting a credit frame with a card field including the output port card termination, and a port field including the output port card channel; and, wherein modifying the destination information in the received packet headers includes:

extracting the output port card termination from the card field; and, inserting the input port card source in the card field.

5. The method of claim 4 wherein routing credits to the source includes:

the eMS sending the credit frame to the output port card iPQ;

the output card iPQ sending the credit frame, via a control link, to the input port card source identified in the card field; and, the input port card source iPQ incrementing the counter in response to receiving the credit frame via the control link.

6. The method of claim 5 wherein routing information packets between port cards on backplane data links through an intervening crossbar includes:

each input port card iPQ negotiating with an arbiter via bid and grant control links for backplane data link access to a crossbar; and, the arbiter enabling backplane data link connections between the crossbar and the port cards in response to the negotiation.

7. The method of claim 6 wherein the output card iPQ sending the credit frame, via a control link, to the input port card source identified in the card field includes:

the output port card iPQ sending the credit frame in a bid control link communication to an intervening arbiter;

the arbiter extracting the input port card source from the card field;

the arbiter inserting the output port card termination in the card field; and, the arbiter forwarding the credit frame in grant control link communications to the input port card source iPQ.

8. The method of claim 7 wherein maintaining a counter for each output port card channel at the input port card iPQ includes maintaining a plurality of counters cross-referenced to output port card terminations and output port card channels;

wherein the input port card source iPQ incrementing the counter in response to receiving the credit frame via the control link includes:

the input port card source iPQ extracting the output port card termination and output port card channel from the credit frame; and, the iPQ cross-referencing a counter to the specified output port card and output port card channel; and, the iPQ incrementing the cross-referenced counter.

9. The method of claim 8 wherein the output card iPQ sending the credit frame, via a control link, to the input port card source identified in the card field includes:

a plurality of output port card iPQs sending a credit frame in corresponding plurality of bid control link communications to a first input port card iPQ through a first intervening arbiter;

the first arbiter aggregating the accepted credit frames;

the first arbiter selecting aggregated credit frames; and, the arbiter forwarding the selected credit frames to the first input port card iPQ.

10. The method of claim 5 wherein the input port card source iPQ incrementing the counter in response to receiving the credit frame via the control link includes incrementing the counter with a plurality of credits in response to receiving a single credit frame.

11. The method of claim 10 wherein incrementing the counter with a plurality of credits in response to receiving a single credit frame includes selecting the plurality of credits to be incremented.

12. The method of claim 11 wherein selecting the plurality of credits to be incremented includes selecting the number of credits in response to the output port card termination and output port card channel specified in the received credit frame.

13. The method of claim 12 wherein selecting the number of credits in response to the output port card termination and output port card channel specified in the received credit frame includes:
   selecting n as the number of credits to be associated with an output port card and output port card channel; and,
   the input pot card source iPQ multiplying the number of credit frames received from the output port card by n and incrementing the cross-referenced counter by the product; and,
   wherein the output card iPQ sending the credit frame, via a control link, to the input port card source identified in the card field includes the output port card iPQ dividing the number of credit frames transmitted to the input port card source from the eMS by n.

14. The method of claim 4 wherein accepting information packets including cell headers with output port card channel destination information includes accepting information selected from a group including the subchannel and the class of service (COS) associated with the channel specified in the cell header destination information; and,
   wherein maintaining a plurality of counters cross-referenced to output port card terminations and output port card channels includes maintaining counters for destinations selected from a group including the subchannel and COS of the channel specified in the cell header destination information.

15. The method of claim 14 wherein accepting information packets including cell headers with output port card channel destination information includes accepting information selected from a group including the input port card channel and input port card subchannel; and,
   wherein maintaining a plurality of counters cross-referenced to output port card terminations and output port card channels includes maintaining counters for destinations cross-referenced to categories selected from a group including the input port card channel and input port card subchannel.

16. In a packet communications switch fabric, a credit-based system for managing backplane traffic flow, the system comprising:
   an input port card including:
      a plurality of ingress ports accepting information packets including cells and cells headers with destination information;
      an ingress memory subsystem (iMS) having an input to accept the packets and an output to supply packets with modified destination information;
      a plurality of selectable ingress backplane data links connected to the iMS output;
      counters that are decremented in response to transmitting cells on an ingress backplane data links and incremented in response to receiving credits;
   a crossbar having inputs connected to the ingress backplane data links, and selectively connected to crossbar outputs;
   an output port card including:
      a plurality of egress channels;
      a plurality of selectable egress backplane data links connected to the crossbar outputs;
      an egress MS (eMS) having an input connected to the egress backplane data links to accept packets and an output selectively connected to the channels, the eMS generating credits in response to transmitting cells and routing the credits to the counter using the modified destination information.

17. The system of claim 16 wherein the input port card iMS has a control line output to signal the transmission of buffered cells on an ingress backplane data link; and,
   the input port card further including an ingress priority queue (iPQ) in which the counters reside, the iPQ having an input connected to the control line from the iMS, and wherein the iPQ decrements the counter in response to receiving transmission signals from the iMS.

18. The system of claim 17 wherein the eMS extracts the destination information from the cell header of buffered packets and creates a credit frame from the modified destination information, the eMS having an output connected to a credit bus for routing credits to the input port card source.

19. The system of claim 18 wherein the input port card iMS accepts cell headers with destination information credit frames with a card field including the output port card termination, and a port field including the output port card channel, the iMS modifying the destination information in the received packet headers by extracting the output port card termination from the card field and inserting the input port card source.

20. The system of claim 19 wherein the output port card further includes an iPQ having an input connected to the credit bus and a port connected to a control link;
   wherein eMS sends the credit frame to the output port card iPQ on the credit bus;
   the output card iPQ sends the credit frame, via the control link, to the input port card source identified in the card field; and,
   wherein the input port card source iPQ has a port connected to a control link, the iPQ incrementing a counter in response to receiving the credit frame via the control link.

21. The system of claim 20 further comprising:
   a switch card including:
      an arbiter having ports connected to input and output port card iPQs for negotiating crossbar access via bid and grant control links, and a output to supply selection commands that enable backplane data link connections through the crossbar; and,
      wherein the crossbar resides in the switch card, the crossbar having an input to accept the selection commands from the arbiter.

22. The system of claim 21 wherein the output card iPQ sends the credit frame in a bid control link communication to an arbiter; and,
   wherein the arbiter extracts the input port card source from the card field, inserts the output port card termination, and forwards the credit frame in grant control link communications to the input port card source iPQ.

23. The system of claim 22 wherein the input port card source iPQ extracts the output port card termination and output port card channel from the credit frame, cross-references a counter to the specified output port card and output port card channel, and increments the cross-referenced counter.

24. The system of claim 23 wherein a plurality of output port card iPQs send a credit frame in corresponding plurality of bid control link communications to the input port card iPQ through control links communications with the arbiter; and, wherein the arbiter aggregates the accepted credit frames, selects aggregated credit frames, and forwards the selected credit frames to the first input port card iPQ.

25. The system of claim 20 wherein the input port card source iPQ increments a counter with a plurality of credits in response to receiving a single credit frame.

26. The system of claim 25 wherein the input port card iPQ selects the number of credits to be incremented in response to the output port card termination and output port card channel specified in the received credit frame.

27. The system of claim 26 wherein the output port card iPQ divides the number of credit frames transmitted to the input port card source from the eMS by n; and, wherein the input port card source iPQ multiplies the number of credit frames received from the output port card by n and increments the cross-referenced counter by the product.

28. The system of claim 19 wherein the input port card iMS accepts cell headers with destination information selected from a group including the subchannel and the class of service (COS) associated with a specified output port card channel; and, wherein the input port card iPQ maintains counters for destinations selected from a group including the subchannel and COS of the channel specified in the cell header destination information.

29. The system of claim 28 wherein the input port card iMS accepts cell headers with destination information selected from a group including the input port card channel and input port card subchannel; and, wherein the input port card iPQ maintains counters for destinations cross-referenced to categories selected from a group including the input port card channel and input port card subchannel.

* * * * *